T. D. POWERS.
Thill-Coupling.
No. 70,357.
Patented Oct 29, 1867.
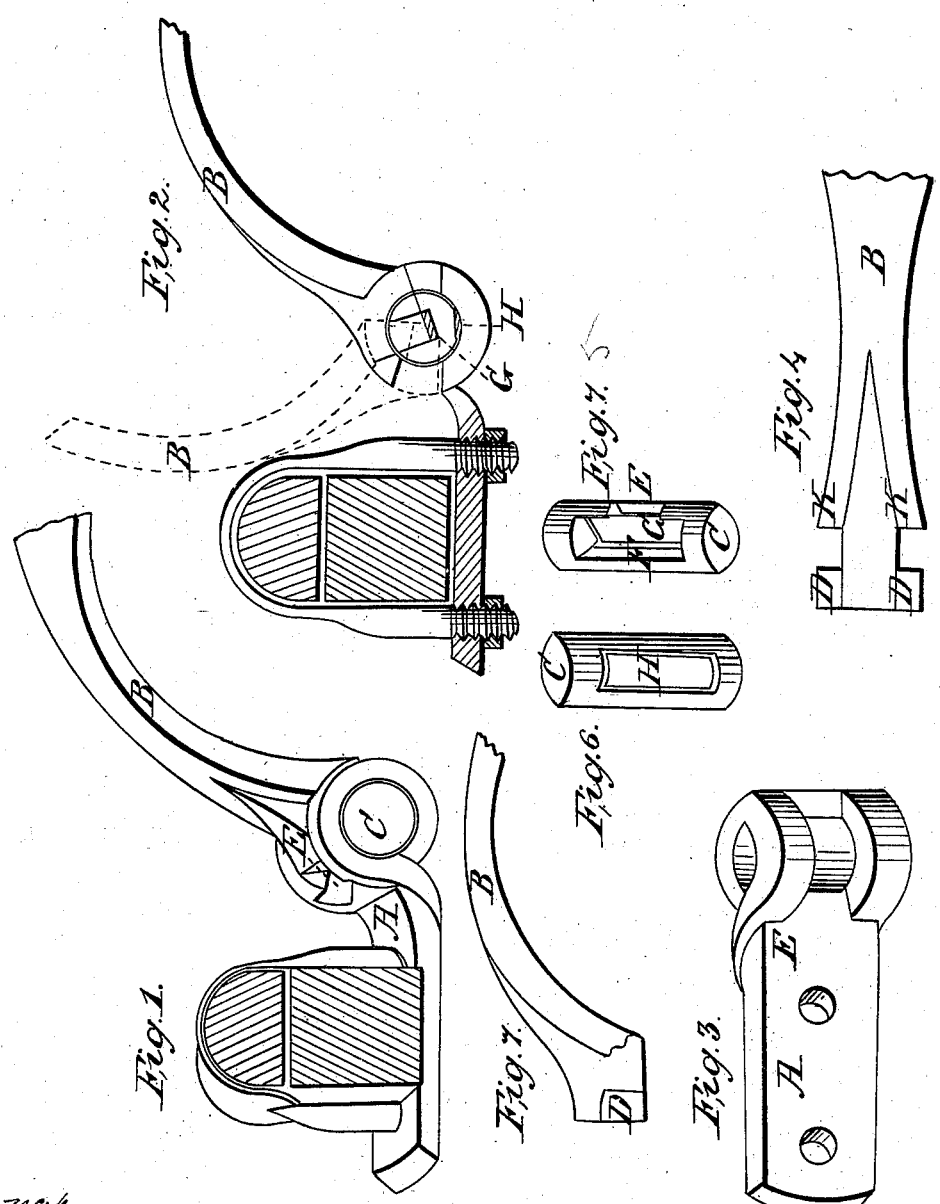
Witnesses:
J. L. Coffin
Judd Burnham
Inventor:
T. D. Powers

United States Patent Office.

THOMAS D. POWERS, OF ROCHESTER, WISCONSIN.

Letters Patent No. 70,357, dated October 29, 1867.

IMPROVEMENT IN WAGON-SHACKLE.

The Schedule referred to in these Letters Patent and making part of the same.

TO WHOM IT MAY CONCERN:

Be it known that I, THOMAS D. POWERS, of Rochester, in the county of Racine, and State of Wisconsin, have invented a new and useful Improvement on a Wagon-Shackle; and I do hereby declare that the following is a full, clear, and exact description of the construction and operation of the same, reference being had to the annexed drawings, making a part of this specification, in which—

Figure 1 is a perspective view.
Figure 2 is a transverse section.
Figure 3 is a draw-iron.
Figure 4 is the shaft-iron.
Figure 5 is the slotted cylinder.
Figure 6 is the cylinder, showing spring.
Figure 7 is the side view of shaft-iron.

Fig. 1. A shows the draw-iron, with clip, axle, and stock, B the shaft attached, C the cylinder, E the aperture.

Fig. 2. B shows the shaft-iron in use. The red lines show the position when attaching and detaching. G shows the end of the rubber spring in the bottom of slotted cylinder.

Fig. 5. H shows the end of metallic spring seen in fig. 6, letter H.

Fig. 3. A, draw-iron; E, aperture or slot; I, an opening to admit the cylinder.

Fig. 4. Shaft iron; D D, the T end; K K, the shoulders of same.

Fig. 5. C, cylinder; F, slot to admit the shaft-iron; L, notch in which the neck of shaft-iron rests; G, rubber spring.

Fig. 6. H, the metallic spring in the bottom.

Fig. 7. Side view of shaft-iron.

In order to enable others skilled in the art to make and use my invention, I will proceed to describe its construction and operation.

I construct a draw-iron, cylinder, and shaft-iron after the pattern laid down and described in the accompanying drawings. I place the metallic spring H in cylinder C, place the cylinder in draw-iron A, place the rubber spring G in slot F, and raise the shaft-iron B, as shown by red lines in fig. 2, draw them forward, and drop them in place.

What I claim as my invention, and desire to secure by Letters Patent, is—

A draw-iron, with a slot, E, a cylinder with a slot, F, notch L, rubber spring G, metallic spring H, a shaft-iron, with T head, shoulders K K, when arranged to operate as shown and described, and for the purpose set forth.

THOS. D. POWERS.

Witnesses:
A. E. GIBSON,
GEORGE BLACK.